July 2, 1963
A. C. STANLEY
3,096,133
PROTECTIVE SNAP COVER FOR RECHARGER CORD RECEPTACLE
OF CORDLESS ELECTRIC TOOL OR APPLIANCE
Filed Aug. 15, 1961
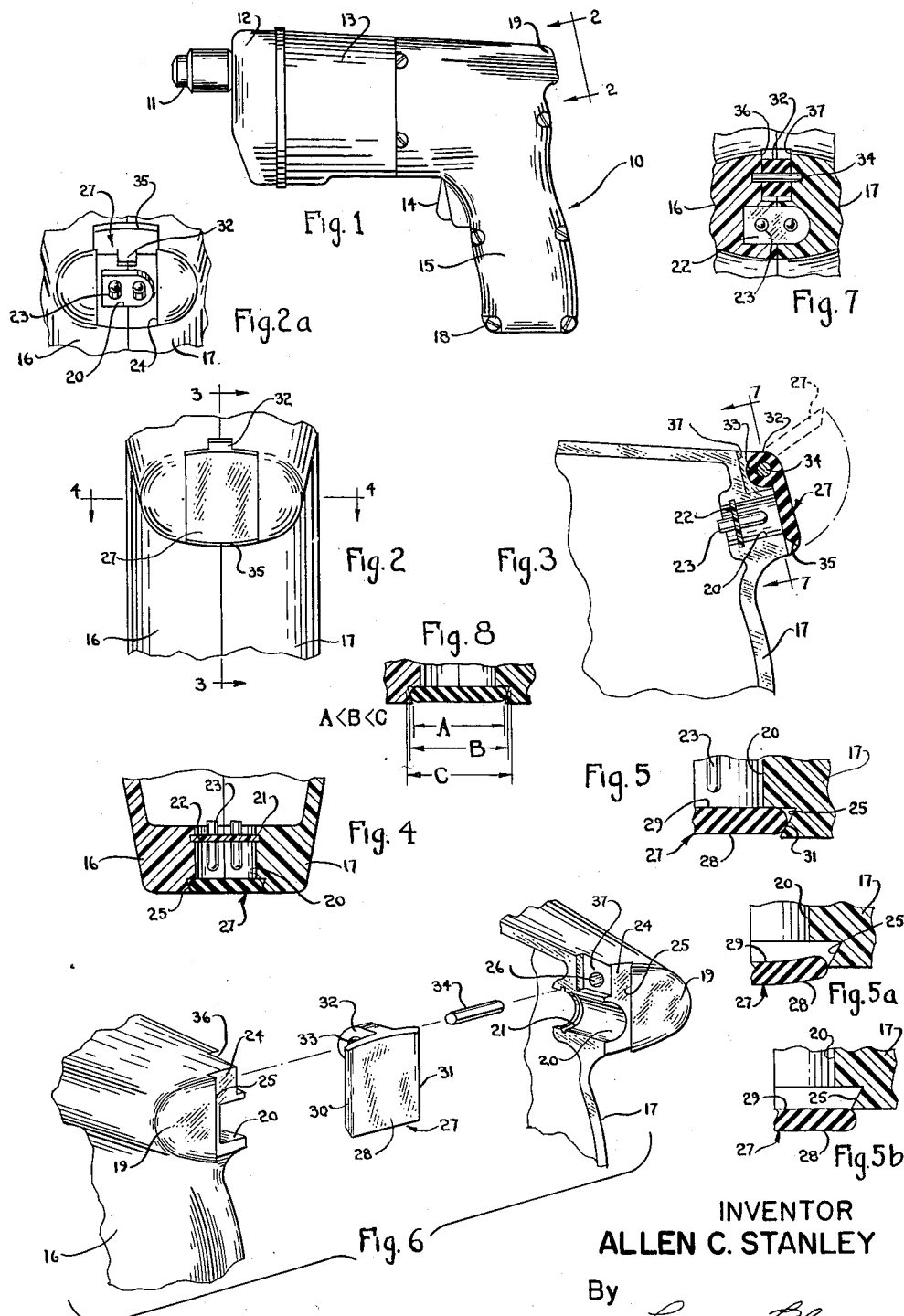
INVENTOR
ALLEN C. STANLEY
By *Leonard Bloom*
ATTORNEY

United States Patent Office 3,096,133
Patented July 2, 1963

3,096,133
PROTECTIVE SNAP COVER FOR RECHARGER CORD RECEPTACLE OF CORDLESS ELECTRIC TOOL OR APPLIANCE
Allen C. Stanley, Baltimore, Md., assignor to The Black and Decker Manufacturing Company, Towson, Md., a corporation of Maryland
Filed Aug. 15, 1961, Ser. No. 131,622
2 Claims. (Cl. 339—44)

The pesent invention relates to a protective snap cover for the recharger cord receptacle of a cordless electric tool or appliance, and more particularly, to such a snap cover that is used in conjunction with a high-efficiency cordless electric drill of the type described in the co-pending Butler et al. application S.N. 102,819, filed April 13, 1961, and assigned to the same assignee as the present invention.

In such a cordless electric drill or appliance, the energy is provided by means of a group of self-contained energy cells or batteries, which are rechargeable; and the cordless electric drill may be provided with a recharger cord receptacle, by means of which the energy cells are occasionally recharged from an outside source. The recharger cord receptacle includes a pair of contact prongs, or equivalent electrical contacts, which are in turn adapted to engage a recharger receptacle plug, the opposite end of which may be connected to a suitable source of direct current. Such a source of direct current may comprise a recharger box, the design for which is illustrated in the co-pending Johnson application S.N. 65,819, filed July 6, 1961, and assigned to the same assignee as that of the present invention.

However, when the cordless electric drill or appliance is not being used, nor recharged, it may be possible for a foreign element, such as a nail, or screw, or even the blade of a screwdriver, to be inadvertently disposed within the recharger cord receptacle in such a manner as to bridge the electrical contact prongs. This may occur when the unit is stored within a tool box or other container which is already overcrowded, and in such an event, the self-contained battery may become short-circuited inadvertently; thus the cordless electric drill or appliance may be completely "rundown" at just the instant that it was needed.

Accordingly, it is an object of the present invention to alleviate this difficulty by providing a protective snap cover for the recharger cord receptacle of a cordless portable electric device.

It is another object of the present invention to provide a protective snap cover that acquires an interference fit with respect to the housing of the unit.

It is yet still another object of the present invention to provide a protective snap cover that may be integrally molded easily and economically.

It is yet still another object of the present invention to provide a protective snap cover that may be easily lifted by the finger of the operator so as to uncover the recharger cord receptacle, and then quickly snapped closed when the unit is not being used or recharged.

It is a further object of the present invention to provide a protective snap cover that is trapped in place in the assembly of a split-housing cordless device.

These and other objects of the present invention will become apparent from a reading of the following specification, taken in conjunction with the enclosed drawings, in which:

FIGURE 1 is a side elevational view of a portable electric cordless drill with which the present invention may find more particular utility;

FIGURE 2 is a view taken along the lines 2—2 of FIGURE 1, showing the protective snap cover closed over the recharger cord receptacle;

FIGURE 2a is a view corresponding to that of FIGURE 2, but showing the protective snap cover lifted to uncover the recharger cord receptacle;

FIGURE 3 is a view taken along the lines 3—3 of FIGURE 2, showing in broken lines the alternate or lifted position of the protective snap cover;

FIGURE 4 is a view taken along the lines 4—4 of FIGURE 2, showing the contact prongs in relationship to the cover;

FIGURE 5 is an enlarged view of a portion of FIGURE 4, showing the rounded side edge of the protective snap cover being received within the beveled undercut of the housing, thus acquiring an interference fit with respect to the housing;

FIGURE 5a is a view corresponding to a portion of FIGURE 5, but showing the protective snap cover in engagement with the beveled undercut of the housing, as when the cover is being lifted;

FIGURE 5b is a view corresponding to that of FIGURE 5a, but showing the protective snap cover completely out of the beveled undercut in the housing;

FIGURE 6 is a perspective view looking into the rear of the cordless drill, and showing in exploded relationship the mating halves of the split housing, the protective snap cover, and the pivot pin for the cover;

FIGURE 7 is a view taken along the lines 7—7 of FIGURE 3; and

FIGURE 8 is a sectional view of the cover, showing its dimensional relationship with respect to the recess in the housing.

With reference to FIGURE 1, there is illustrated a cordless portable electric drill 10 having a chuck 11, gear case 12, field housing 13, trigger 14, and a pendant handle 15; and with reference to FIGURES 1 and 2, there is illustrated a pair of complementary mating halves 16 and 17, which are detachably secured together by means of a plurality of screws 18. Moreover, the pendant handle 15 includes a rearwardly-protruding portion 19 which contains the recharger cord receptacle hereinafter to be described in detail.

With reference to FIGURES 2, 2a, 3, 4, and 6, each of the mating halves 16 and 17 has a first recess 20 formed within the rearwardly-protruding portion 19, and the recesses 20 are adapted to communicate with each other when the halves 16 and 17 are secured together. Recess 20 for mating half 16 has a semi-rectangular cross-section, while the corresponding recess 20 for mating half 17 has a semi-circular cross-section; and hence, when the mating halves 16 and 17 are secured together, the communicating recesses 20 will form a keyway to properly orient the recharger plug (not shown), thus insuring the proper electrical polarity for the recharging process. Corresponding grooves 21 are formed within the communicating recesses 20, and an insulated terminal strip 22 is positioned within the grooves 21 and is trapped in place when the halves 16 and 17 are secured together. The terminal strip 22 carries a pair of conventional electrical prongs 23, and it will be appreciated that an electrical connection (not shown) is made from each of the prongs 23 to the self-contained batteries or energy cells, which are likewise not shown, but which are included within the drill 10.

Moreover, each of the halves 16 and 17 further have a second recess 24 adjacent to the first recess 20 and opening outwardly of the rearwardly-protruding portion 19 of the handle 15; the second recesses 24 are likewise adapted to communicate with each other when the mating halves 16 and 17 are secured together, and it will be appreciated from an examination of the drawings that the recesses 20 and 24 (see FIGURES 2a and 6) also communicate with each other. These second communicating recesses 24 each have side edges 25 which are beveled inwardly so as to form an undercut along each of the edges 25.

Furthermore, each of the mating halves 16 and 17 have a respective hole 26 formed therein near one side of the first recesses 20, and when the mating halves 16 and 17 are secured together, the holes 26 will be aligned with each other along an axis which is transverse to the side edges 25 of the second communicating recesses 24.

With reference to FIGURES 3, 5, 6, and 7, the protective snap cover 27 comprises a single molded piece having a flat top surface 28 and a substantially parallel flat undersurface 29; and the protective snap cover 27 further has parallel side edges 30 and 31, which as shown more clearly in FIGURE 5, are slightly rounded of in cross section. Moreover, the protective snap cover 27 is provided with an integral boss 32 which is joined to the flat undersurface 29 and which projects therefrom, and the boss 32 has a hole 33 formed therein transversely of the parallel side edges 30 and 31 of the cover 27. A pivot pin 34 is disposed within the holes 26 in the housing portion 19; and in the assembly of the unit, the pin 34 passes through the hole 33 formed in the boss 32 of the cover 27, so as to trap the cover 27 between the mating halves 16 and 17 when those halves are secured together, as shown in FIGURE 7. Thus the cover 27 is allowed to have a limited pivoting movement about the pin 34, but there is sufficient frictional engagement between the boss 32 (and the respective recesses 36 and 37 of mating halves 16 and 17) so that the cover 27 will remain in the lifted position unless deliberately closed by the user. Moreover, the cover 27 has a lowermost inwardly-beveled lip 35 so that it may be readily engaged by the finger of the operator for lifting the cover and uncovering the electrical prongs 23 of the recharger cord receptacle.

With reference to FIGURES 5, 5a, and 5b, when the cover 27 is lifted away from the prongs 23, the cover 27 will ride up on the beveled undercut of the side edges 25; and hence the cover 27 will tend to spread or become slightly bowed by the halves 16 and 17 (see FIGURE 5a), thus allowing the cover 27 to be lifted. Conversely, the cover may be forced down against the beveled undercut of the edges 25, again slightly distorting or bowing the cover 27 (in a reverse direction than that illustrated in FIGURE 5a), and thus allowing the cover 27 to exhibit a spring effect with relation to the mating halves 16 and 17. Consequently, the cover 27 acquires a snap fit within the recess 24 and will not be uncovered or disengaged unless deliberately lifted by the operator in the manner hereinbefore described.

With reference to FIGURE 8, the side edges 25 of the second communicating recesses 24 have a minimum lateral dimension (denoted by A) measured between the respective tips of the beveled undercuts; and the cover piece 27 has a maximum lateral width (denoted by B) measured between the rounded-off parallel side edges 30 and 31, while the side edges 25 of the communicating recesses 24 have a maximum lateral dimension (denoted by C) measured between the respective troughs of the beveled undercuts. In the embodiment of the present invention illustrated herein, the dimension A is less than the dimension B, which is in turn less than the dimension C, as expressed in the formula:

$$A < B < C$$

Obviously, many modifications may be made without departing from the basic spirit of the present invention; and therefore within the scope of the appended claims, the invention may be practiced other than has been specifically described.

I claim:
1. In a cordless electric device, the combination of a recharger cord receptacle and a protective snap cover for the receptacle, comprising:
   (a) a housing having a first recess within which a pair of electrical contacts are mounted;
   (b) said housing further having a second recess communicating with said first recess and through which said electrical contacts are externally accessible;
   (c) a substantially-flat snap cover adapted to be received flush within said second recess and to have an interference fit with respect to said housing;
   (d) said cover having a pair of parallel side edges, each of which is rounded off;
   (e) said second recess having parallel side walls, each of which has a beveled undercut; with the lateral width of said cover, measured across said side edges thereof, being slightly greater than the minimum lateral width of said second recess measured between the respective tips of said beveled undercuts; and with the maximum lateral width of said second recess, measured across the respective troughs of said beveled undercuts, being slightly greater than the lateral width of said cover;
   (f) said cover being formed of a flexible material, and said housing being formed of a more rigid material than said cover, whereby said cover will flex inwardly and outwardly as it is alternately moved in and out of said housing;
   (g) said housing further having a third recess above said first recess and anteriorly in said housing with respect to said second recess and communicating with said second recess;
   (h) said cover having an integral rearward boss portion received within said third recess; and
   (i) a pin carried by said housing and passing through said boss to pivotally mount said cover to said housing.
2. The combination according to claim 1, wherein:
   (a) said boss portion of said cover has a lateral width which is approximately equal to the corresponding lateral width of said third recess, whereby said boss is frictionally engaged by said housing, and whereby said cover will remain in an open position until manually pushed into its closed position.

References Cited in the file of this patent
UNITED STATES PATENTS

| | | |
|---|---|---|
| 943,958 | Wheeler | Dec. 21, 1909 |
| 1,399,899 | Sontgerathe et al. | Dec. 13, 1921 |
| 1,574,020 | Black et al. | Feb. 23, 1926 |
| 2,200,395 | Lobl | May 14, 1940 |
| 2,364,194 | Cortner | Dec. 5, 1944 |
| 2,657,822 | Simpson | Nov. 3, 1953 |
| 2,688,995 | Wagoner | Sept. 14, 1954 |
| 2,730,685 | Sperzel | Jan. 10, 1956 |
| 2,765,094 | Ryan | Oct. 2, 1956 |
| 2,878,456 | Cormier | Mar. 17, 1959 |